United States Patent
Glugla et al.

(10) Patent No.: US 9,604,645 B2
(45) Date of Patent: *Mar. 28, 2017

(54) METHOD AND SYSTEM TO CONTROL VEHICLE OPERATION

(71) Applicant: Ford Global Technologies, LLC, Dearborn, MI (US)

(72) Inventors: Chris Paul Glugla, Macomb, MI (US); Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/633,507

(22) Filed: Feb. 27, 2015

(65) Prior Publication Data
US 2015/0166068 A1 Jun. 18, 2015

Related U.S. Application Data

(62) Division of application No. 13/672,593, filed on Nov. 8, 2012, now Pat. No. 8,974,346.

(51) Int. Cl.
| | |
|---|---|
| *B60W 10/11* | (2012.01) |
| *B60W 30/188* | (2012.01) |
| *F16H 61/16* | (2006.01) |
| *B60W 10/06* | (2006.01) |
| *F16H 59/60* | (2006.01) |
| *F02D 29/02* | (2006.01) |
| *F16H 61/04* | (2006.01) |
| *F02B 29/04* | (2006.01) |

(52) U.S. Cl.
CPC ........ *B60W 30/1884* (2013.01); *B60W 10/06* (2013.01); *B60W 10/11* (2013.01); *F02B 29/04* (2013.01); *F16H 61/16* (2013.01); *F02B 29/0468* (2013.01); *F02D 29/02* (2013.01); *F16H 59/60* (2013.01); *F16H 2061/0444* (2013.01); *F16H 2061/163* (2013.01); *Y10S 477/902* (2013.01); *Y10T 477/65* (2015.01); *Y10T 477/688* (2015.01)

(58) Field of Classification Search
CPC ............... Y10T 477/688; Y10T 477/65; Y10S 477/902; B60W 10/11; F02B 29/04; F16H 61/16; F16H 2061/04444; F16H 2061/163; F16H 59/60
USPC .......................................................... 701/65
See application file for complete search history.

(56) References Cited

U.S. PATENT DOCUMENTS

| | | | |
|---|---|---|---|
| 6,470,731 | B1 | 10/2002 | Rieth |
| 7,559,875 | B2 | 7/2009 | Steinhauser et al. |
| 7,637,833 | B2 | 12/2009 | Fukushiro et al. |

(Continued)

FOREIGN PATENT DOCUMENTS

JP H034068 A 1/1991

*Primary Examiner* — Roger Pang
(74) *Attorney, Agent, or Firm* — Julia Voutyras; McCoy Russell LLP (57) ABSTRACT

Methods and systems are provided for performing a multiple gear downshift of a transmission gear by transiently operating in an intermediate gear. In response to ambient humidity and a condensate level in a charge air cooler, the transmission gear may be downshifted from a higher gear to an intermediate gear, and then to a requested lower gear. Downshifting through an intermediate gear may also be controlled based on the gear shift request.

8 Claims, 7 Drawing Sheets

(56) References Cited

U.S. PATENT DOCUMENTS

| | | | |
|---|---|---|---|
| 8,694,216 B2* | 4/2014 | Swartling | B60W 30/19 477/120 |
| 8,961,368 B2* | 2/2015 | Glugla | B60W 20/15 477/110 |
| 8,974,346 B2* | 3/2015 | Glugla | F16H 61/16 477/115 |
| 9,004,046 B2* | 4/2015 | Glugla | F02M 25/0227 123/542 |
| 9,017,217 B2* | 4/2015 | Norman | F16H 61/0213 477/98 |
| 2011/0162596 A1 | 7/2011 | Kardos et al. | |
| 2012/0012088 A1 | 1/2012 | Jung | |
| 2012/0090584 A1 | 4/2012 | Jung | |
| 2014/0100074 A1* | 4/2014 | Glugla | B60W 20/15 477/3 |
| 2014/0123963 A1 | 5/2014 | Glugla et al. | |
| 2014/0128222 A1 | 5/2014 | Norman et al. | |
| 2014/0157772 A1 | 6/2014 | Glugla et al. | |

* cited by examiner

METHOD AND SYSTEM TO CONTROL VEHICLE OPERATION

CROSS REFERENCE TO APPLICATIONS

The present application is a divisional of U.S. patent application Ser. No. 13/672,593, entitled "METHOD AND SYSTEM TO CONTROL VEHICLE OPERATION," filed Nov. 8, 2012, the entire contents of which are hereby incorporated by reference for all purposes.

BACKGROUND/SUMMARY

Turbo charged engines utilize a Charge Air Cooler (CAC) to cool compressed air from the turbocharger, before it enters the engine. Ambient air from outside the vehicle travels across the CAC to cool intake air passing through the inside of the CAC. Condensate may form in the CAC when the ambient air temperature decreases, or during humid or rainy weather conditions, where the intake air is cooled below the water dew point. When the intake air includes recirculated exhaust gasses, the condensate can become acidic and corrode the CAC housing. The corrosion can lead to leaks between the air charge, the atmosphere, and possibly the coolant in the case of water-to-air coolers. Condensate may accumulate in the CAC, and then be drawn into the engine at once during times of increased air mass flow, increasing the chance of engine misfire. Air mass flow may increase to greater levels when downshifting from a higher to a lower transmission gear at wide open throttle. If enough condensate has accumulated in the CAC and airflow through the CAC increases to high levels during multiple gear downshifts, engine misfire may occur.

Other attempts to address engine misfire due to condensate ingestion involve avoiding condensate build-up. However, the inventors herein have recognized potential issues with such methods. Specifically, while some methods may reduce or slow condensate formation in the CAC, condensate may still build up over time. If this build-up cannot be stopped, ingestion of the condensate during downshifting, specifically during downshifts that skip one or more intermediate gears, may increase the chance of engine misfire.

In one example, the issues described above may be addressed by a method for performing a multiple gear downshift in stages, controlling the increase in air mass flow and condensate purging from the CAC. Specifically, a transmission gear may be downshifted from a higher gear to a lower gear by transiently operating in an intermediate gear before shifting to the lower gear. In this way, condensate may be purged from the CAC at a lower air mass flow, while in the intermediate gear. Thus, when finally downshifting to the lower gear, engine misfire may be reduced due to increased air mass flow.

As one example, in response to a multiple gear downshift request, a transmission gear may be downshifted from a higher gear to a lower gear. If the requested downshift increases air mass flow to a high level, engine misfire may occur if the amount condensate in the CAC has reached a threshold level. Condensate may accumulate in the CAC during periods of lower airflow. Once the threshold level of condensate has been reached, misfire may be reduced by controlling the execution of a requested multiple gear downshift. For example, in response to a multiple gear downshift request and CAC condensate above a threshold level, the transmission gear may be downshifted from a higher gear to an intermediate gear, and then to the requested lower gear. By holding the transmission gear at the intermediate gear for a duration, condensate may be blown off the CAC and into the engine at a slower rate. Then, when shifting to the lower gear, the increase in air mass flow reduces engine misfire since stored condensate has already been purged from the CAC. In this way, engine misfire may be reduced during multiple gear downshifts by utilizing an intermediate gear to control the increase in air mass flow and resulting condensate purging from the CAC.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
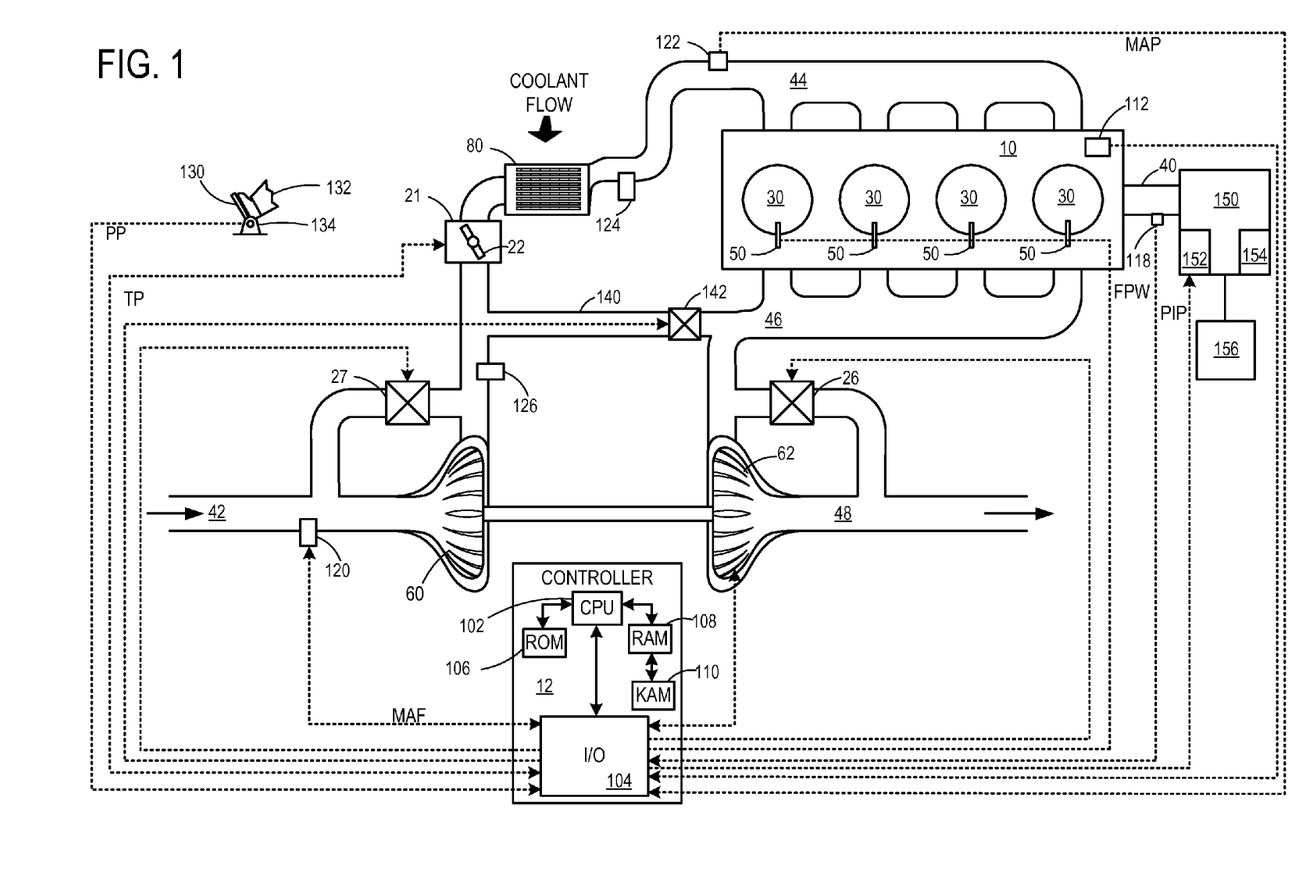
FIG. 1 is a schematic diagram of an example engine system including a charge air cooler.
Figure 6:
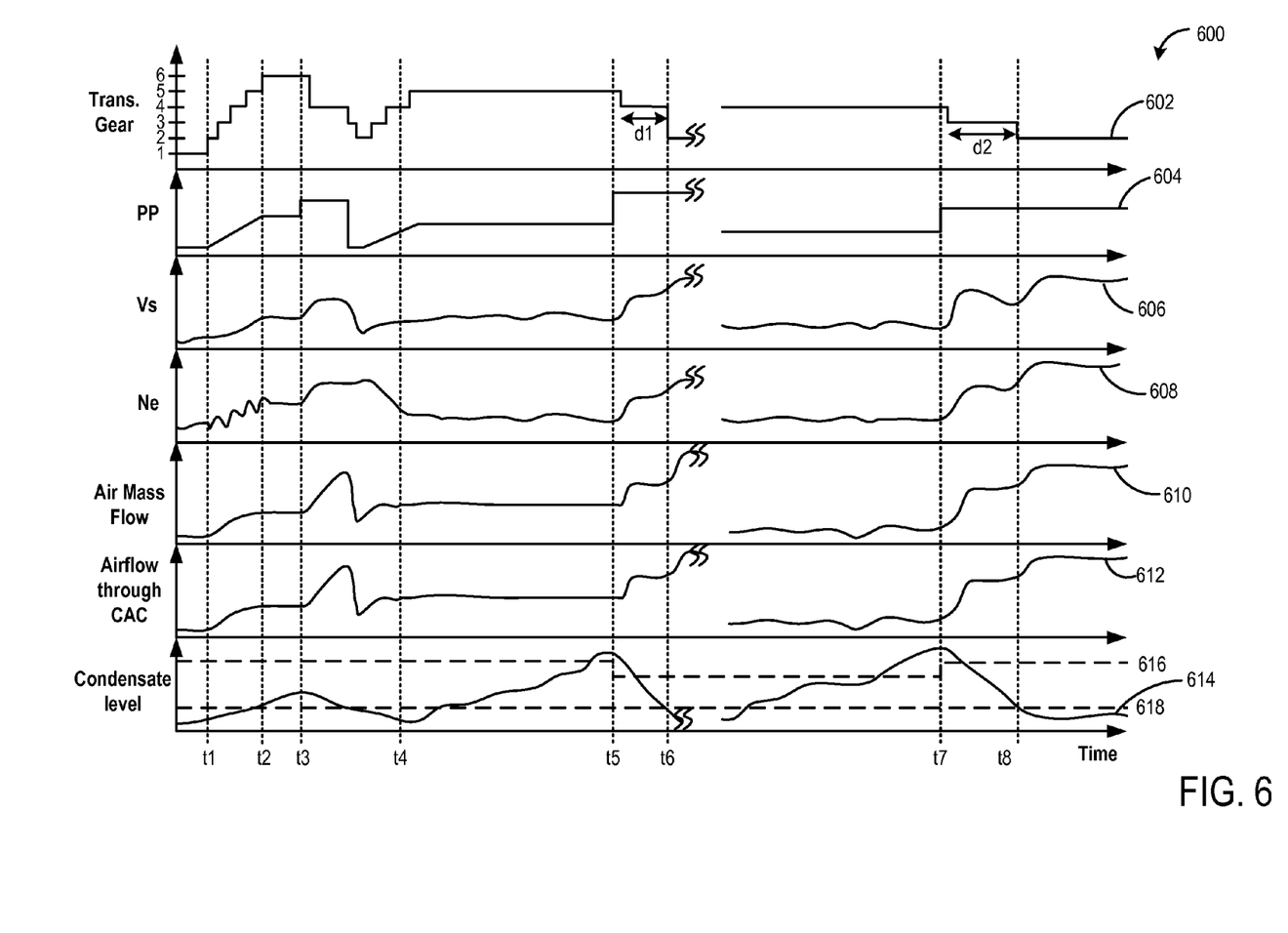
FIGS. 6-7 show example gear shifting operations during different driving conditions.
Figure 7:
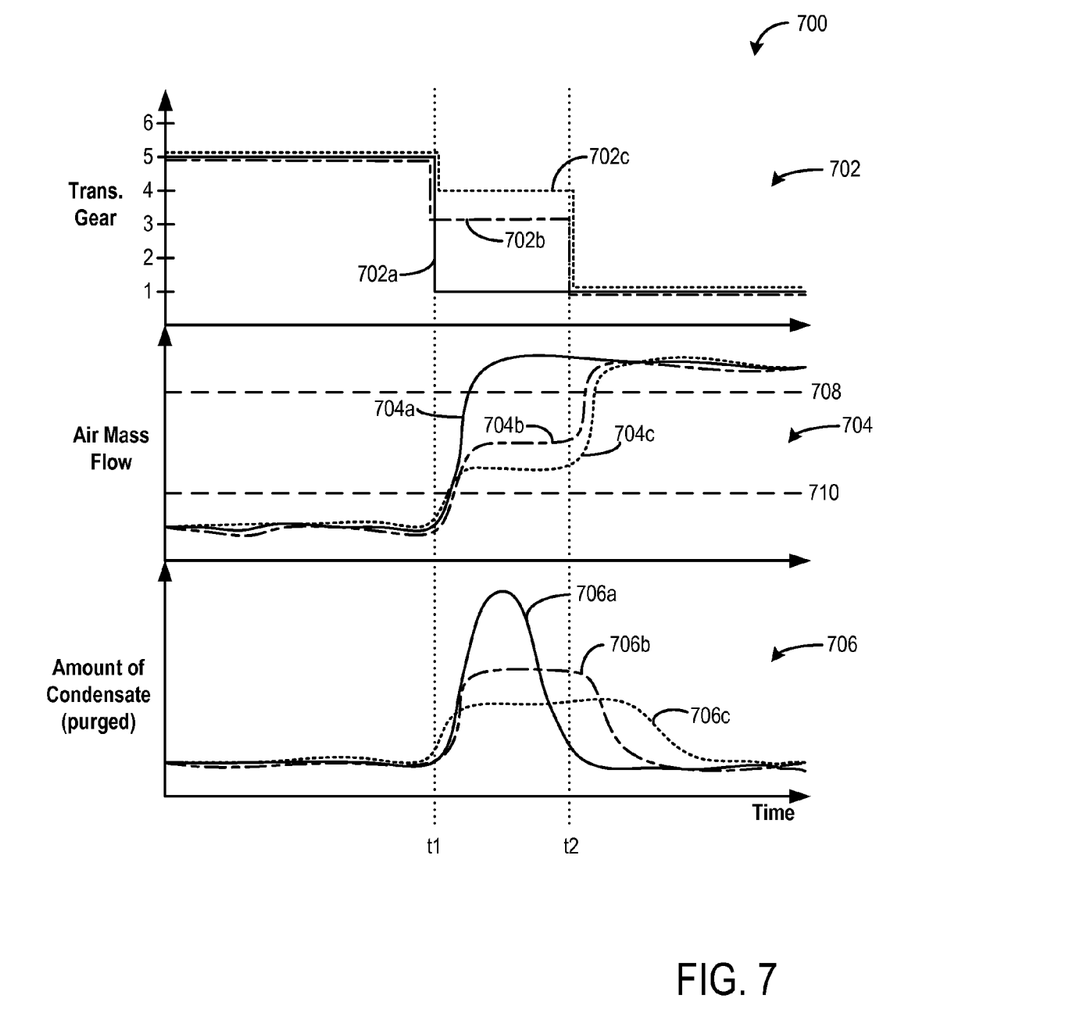

The following description relates to systems and methods for performing a multiple gear downshift of a transmission gear in an engine system, such as the system of FIG. 1. A gear shift request may be generated in response to a change in pedal position. A method for shifting a transmission gear in response to varying shifting requests is presented in FIG. 2. In response to a request to shift to a new gear, the transmission may upshift to a higher gear, downshift by a single gear, or downshift by multiple gears. A multiple gear downshift may either be performed directly from a higher to a lower gear or in stages, by temporarily downshifting to an intermediate gear based on factors related to condensate release in the charge air cooler. A controller may perform a control routine, such as the routine of FIG. 3, to determine if an intermediate gear may be used, based on the level of condensate in the CAC. FIG. 4 presents one method for determining the level of condensate in the CAC. This method may be modified by a method for inferring a humidity value, shown at FIG. 5, based on CAC efficiency and windshield wiper speed. Example shifting operations are shown at FIGS. 6-7. In this way, condensate may be purged at a slower rate from a CAC by downshifting first to an intermediate gear and then to a lower gear in order to reduce engine misfire.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system 150. The transmission system 150 may include a multiple fixed gear automatic transmission having a plurality of discrete gear ratios, clutches, etc. In one example, the transmission may have only 8 discrete forward gears and 1 reverse gear. Further, a starter motor may be coupled to crankshaft 40 via a flywheel to enable a starting operation of engine 10.

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have six available gears, where transmission gear six (transmission sixth gear) is the highest available gear and transmission gear one (transmission first gear) is the lowest available gear. In other embodiments, the vehicle may have more or less than six available gears.

As elaborated herein, a controller may vary the transmission gear (e.g., upshift or downshift the transmission gear) to adjust an amount of torque conveyed across the transmission and torque converter to vehicle wheels 156 (that is, an engine shaft output torque). Changes in the pedal position signal (PP), in combination with vehicle speed, may indicate to the controller that a change in transmission gear is requested. For example, as vehicle speed increases, the controller may upshift a transmission gear (e.g., from a transmission first gear to a transmission second gear). In one example, the controller may downshift a transmission gear when pedal position increases at a constant vehicle speed. At a relatively constant throttle opening, as vehicle speed increases, a transmission gear may be upshifted. Then, as pedal position increases, more torque demand may be requested, causing the transmission to downshift a transmission gear. Then, as vehicle speed increases, the transmission gear may be upshifted again. Alternatively, as PP decreases at a given vehicle speed, the controller may downshift a transmission gear (e.g., from a transmission third gear to a transmission second or first gear). The vehicle may upshift or downshift by one or more transmission gears. Under certain circumstances, the vehicle may perform a multiple gear upshift or downshift. For example, downshifts that skip one or more intermediate gears may be referred to as multiple gear downshifts. In one example, the vehicle may be traveling in a higher gear when the PP increases by a large amount, such as when the pedal is depressed fully (wide open pedal (WOP)). In this situation, the controller may downshift by multiple gears in order to increase engine speed torque. The lower gears may then result in higher engine speed (RPM) and vehicle acceleration. For example, the controller may downshift from a sixth transmission gear to second transmission gear. Thus, the transmission may "skip" three gears and downshift by four gears. In this way, multiple gear downshifts may be responsive to large increases in pedal position, such as WOP, as compared to smaller increases in pedal position with a downshift among two neighboring gears (e.g., $6^{th}$ to $5^{th}$).

As the vehicle downshifts a transmission gear, and the throttle is opened, the engine speed increases. This increases the air mass flow rate (e.g., air mass flow or mass air flow) through the engine. As such, at lower gears, the air mass flow increases. Air mass flow may further increase during a multiple gear downshift. The controller may measure air mass flow from a mass air flow (MAF) sensor 120, which can approximate the airflow through a charge air cooler. The controller may then use this information to control other engine components and processes, such as gear shifting. This will be explained further below with respect to a charge air cooler and FIGS. 2-4.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted air mass flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, Hall effect sensor 118, which is also used as an engine speed sensor, may produce a predetermined number of equally spaced pulses every revolution of the crankshaft 40.

Other sensors that may send signals to controller 12 include a temperature sensor 124 at an outlet of a charge air cooler 80, and a boost pressure sensor 126. Other sensors not depicted may also be present, such as a sensor for determining the intake air velocity at the inlet of the charge air cooler, and other sensors. In some examples, storage medium read-only memory chip 106 may be programmed with computer readable data representing instructions executable by microprocessor unit 102 for performing the methods described below as well as other variants that are anticipated but not specifically listed. Example routines are described herein at FIG. 4.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position (TP) of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42, such as a throttle upstream of the compressor 60 (not shown).

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor recirculation valve (CRV) 27 configured to divert intake air around compressor 60. Wastegate 26 and/or CRV 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. CAC 80 may also be a variable volume CAC. Hot charge air (boosted air) from the compressor 60 enters the inlet of the CAC 80, cools as it travels through the CAC, and then exits to enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Increased airflow through the CAC may purge condensate from the CAC. However, if too much condensate is introduced at once into the engine, it may increase the chance of engine misfire due to the ingestion of water.

Airflow through the CAC increases as air mass flow increases. Air mass flow may increase or decrease, depending on vehicle operating conditions. These conditions may include: whether or not the vehicle is towing a load and which transmission gear the vehicle is operating in. For example, air mass flow may be higher at a second transmission gear than a fourth transmission gear. In this way, as a transmission gear decreases (when downshifting), air mass flow increases. Further, air mass flow may increase to a greater level when downshifting by multiple gears. For example, when downshifting from a sixth to a fourth transmission gear, the air mass flow may increase to a first level. However, when downshifting from a sixth to a second transmission gear, the air mass flow may increase to a second level, greater than the first level. Thus, as a transmission gear is downshifted to a lower gear, airflow through the CAC increases.

The airflow through the CAC may reach a level such that condensate is stripped from the CAC and into the intake manifold of the engine. Depending on the CAC design, a threshold level or range of air mass flow may cause condensate to be purged from the CAC. This threshold range or level may be low enough so that the condensate is blown off at a slow enough rate and misfire may not occur. In this way, each CAC may have a threshold range of air mass flow in which the CAC will self-cleanse, without causing misfire.

However, as air mass flow and airflow through the CAC increase further, more condensate may be stripped from the CAC. For example, at lower transmission gears, airflow may increase, increasing the level of purging. As air mass flow and airflow through the CAC increase, the rate that condensate is purged from the CAC may increase. If a large amount of condensate in the CAC is purged at a high enough rate, engine misfire may occur. As such, a CAC may have a first threshold level of condensate (first threshold level) in which a certain increase in airflow causes misfire.

Air mass flow may increase to a level which increases the chance misfire during certain engine operating conditions, such as during a tip-in or during a large downshift. For example, during a multiple gear downshift at WOP, air mass flow may increase above a threshold level; blowing off condensate from the CAC at an increased rate and increasing the chance engine misfire if enough condensate has accumulated. As the amount of downshift (number of transmission gears) increases, the air mass flow, airflow through the CAC, and chance of engine misfire increases. Different amounts of downshifting may result in the air mass flow increasing to different levels. For example, as explained above, downshifting from a sixth to a fourth transmission gear may increase the air mass flow to a first level. This first level may not cause misfire for a certain level of condensate in the CAC. However, when downshifting from a sixth to a second transmission gear, the air mass flow may increase to a second level. The second level may cause engine misfire for the same level of condensate in the CAC. As such, the first threshold level of condensate may depend on the specific downshift request.

The first threshold level of condensate may decrease as airflow increases, since the increased airflow may strip condensate from CAC at a faster rate (e.g., all at once). For example, the first threshold level of condensate may decrease with a larger multiple gear downshift request. In this example, a larger downshift may increase air mass flow to a higher level, increasing the airflow through the CAC and possibly causing engine misfire. In an alternate example, the first threshold level of condensate may increase with a smaller multiple gear downshift. For example, if the transmission only downshifts by two transmission gears, air mass flow may increase to a lower level (than downshifting by three or more transmission gears). Airflow through the CAC may therefore purge condensate at a slower rate. Thus, a larger amount of CAC condensate may be purged without causing engine misfire. In this way, the first threshold level (of condensate) may be based on an increase in airflow through the CAC at a specific downshift request.

During conditions when airflow through the CAC may increase and condensate level in the CAC is above a first threshold level, measures may be taken to increase air mass flow more slowly, decreasing the rate of condensate purging. Thus, the chance of engine misfire may be reduced. This may be accomplished by a method for downshifting multiple transmission gears (e.g., downshifting by more than one transmission gear) in stages. For example, instead of shifting directly from a higher gear to a lower gear and possibly causing misfire, the controller may shift the transmission from a higher gear to an intermediate gear, and then to a lower gear. The intermediate gear may be held briefly (e.g., several seconds) before shifting to the lower gear. This may allow air mass flow to increase to a first, lower rate, allowing condensate to be blown off into the engine at a slower rate. Thus, the CAC may be quickly cleansed at the intermediate gear while reducing potential for misfire. In one example, condensate may be completely purged from the CAC at the intermediate gear. In another example, an amount of condensate may be purged at the intermediate gear such that the remaining amount of condensate may be purged at the lower gear without causing misfire. Thus, the duration in which the intermediate gear is held may be based on the amount of condensate in the CAC and the requested gear downshift. For example, at a larger amount of CAC condensate, the duration at the intermediate gear may be longer. In another example, when the requested gear downshift is smaller (e.g., downshifting by three gear rather than four gears), the duration at the intermediate gear may be shorter. In this way, the duration at the intermediate gear may be the amount of time for the CAC condensate level to decrease below a second threshold level, the second threshold level based on the amount of condensate in the CAC and the requested gear downshift.

In one embodiment, the duration spent in the intermediate gear may be based on the RPM achieved at the intermediate gear. If the engine speed (RPM) is too high, the lower gear (e.g., final gear) may be selected higher that the originally selected lower gear. Specifically, if too much time is spent in the intermediate gear, increasing engine speed, a higher, lower (e.g., final) gear may be selected. For example, if an original gear shift request is from the sixth to the fourth to the third transmission gear, and the duration at the intermediate gear (gear 4) exceeds a threshold, the transmission may instead shift from the fourth to the second transmission gear. In this example, the lower gear is changed from the third to the second transmission gear. This may further control condensate purging, reducing misfire risk.

There may be many different combinations and situations for transiently operating in an intermediate gear when downshifting a transmission gear from a higher gear to a lower gear. Various combinations of higher, intermediate, and lower transmission gears may be used, depending on the downshift request and engine operating conditions. These engine operating conditions may include CAC condensate level and air mass flow. In one example, the transmission may downshift from a sixth transmission gear to a fifth, intermediate, transmission gear, to a second gear (may be written as 6-4-2). In this example, the intermediate gear is the fourth transmission gear. In another example, the intermediate gear may be the fifth (6-5-2) or third (6-3-2) transmission gear. In a second example, the transmission may downshift from a fifth transmission gear to a fourth, intermediate, transmission gear, to second transmission gear (5-4-2). In another example, the intermediate gear may be the third transmission gear (5-3-2). Similar combinations may be used with an alternate higher gear (e.g., fourth transmission gear) and different intermediate and lower transmission gears.

In some cases, the downshift from the higher gear to the lower gear may not increase the air mass flow above the threshold level and cause misfire. Thus, the CAC condensate level may be below the first threshold level. In this situation, the controller may not shift the transmission to the intermediate gear, but directly to the lower gear. In the cases in which an intermediate gear is needed, the selection of intermediate gear may be based on the level (or amount) of condensate in the CAC. Specifically, the intermediate gear may be based on the difference between the first threshold level of condensate and the condensate level in the CAC. For example, if the difference between the first threshold level (of condensate) and the condensate level in the CAC is large (amount of condensate in the CAC is high) and the vehicle is to shift from the sixth to the second transmission gear, the intermediate gear may be closer to the higher gear (such as five vs. three). In this example, shifting 6-3-2 may cause misfire, whereas shifting 6-5-2 may increase air mass flow at a slower rate, reducing the chance of misfire. In this way, the intermediate gear may be closer to the higher gear when the difference between the first threshold level of condensate and the condensate level in the CAC is large. Alternatively, the intermediate gear may be closer to the lower gear when the difference between the first threshold level of condensate and the condensate level is small.

In some embodiments, the controller may adjust engine torque when performing a multiple gear downshift in stages by transiently operating at an intermediate gear. Engine speed and air mass flow may increase both when shifting to the intermediate gear and when shifting to the final lower gear. In order to go unnoticed by the vehicle operator, engine torque may be adjusted at the intermediate gear if the throttle is not fully open. For example, adjustments to torque may only take place if the downshift is performed at part throttle when additional torque may be requested by opening up the throttle. If the downshift maneuver is performed at WOP, then a trade off of torque and acceleration rate may be made to minimize the risk of misfire. For example, some degradation of vehicle performance due to downshifting in stages may be less than the degradation and impact to emissions if a misfire occurs due to ingestion of condensate.

The amount or level of condensate in the CAC may be determined, based on engine operating conditions. These may include air mass flow, ambient temperature and pressure, CAC temperatures and pressures (e.g., at the CAC inlet and outlet), an EGR amount, humidity, and engine load. The condensate level may be estimated using a combination of the above conditions and/or calculated using a condensate model. Details on these methods are presented in detail below with reference to FIGS. 3-5. The condensate model, presented at FIG. 4, uses ambient humidity to calculate the level of condensate in the CAC. Humidity may be determined from a humidity sensor or assumed to be 100%, if a humidity sensor is not available. However, this may overestimate the condensate formation in the CAC during low humidity weather conditions. Thus, in some examples, when performing a multiple gear downshift, the controller may downshift the transmission gear in stages (using an intermediate gear) when CAC condensate is not actually above the first threshold level.

A method for more accurately estimating humidity may improve the condensate model, allowing multiple gear downshifting through an intermediate gear to occur only when condensate levels in the CAC are actually high (e.g., during high humidity conditions). This method may include setting humidity to a percentage, based on engine operating conditions. These conditions may include charge air cooler efficiency and windshield wiper speed. CAC efficiency may be determined from CAC inlet an outlet temperatures. For example, at high efficiency levels, the humidity may be set to a higher percentage. In some embodiments, if CAC efficiency is above a threshold level, humidity may be assumed high and set to 100%. In other embodiments, high humidity may be confirmed by a windshield wiper on/off signal or windshield wiper speed. For example, if the wipers are on, or wiper speed is above a threshold speed, high humidity may be confirmed and set to 100%. In some examples, this percentage may be something lower than 100%. In this way, the humidity value may be greater for increased CAC efficiency and windshield wiper speed. In yet another embodiment, wiper speed may be used alone to determine humidity for the condensate model. Additional embodiments may include an input from a rain sensor used for automatic wiper motor. The rain sensor may determine the rate of rain fall and may be proportional to the scheduled wiper motor speed.

Methods for downshifting a transmission gear may be responsive to an ambient condition, such as ambient humidity. Ambient humidity may be based on CAC efficiency. A higher ambient humidity may be confirmed at a windshield wiper speed above a threshold speed. Thus, the ambient humidity value may increase with increasing CAC efficiency and windshield wiper speed. As humidity increases, the amount of condensate in the CAC may increase. In this way, in response to an ambient condition and a request to downshift a transmission gear from a higher gear to a lower gear, the transmission may be transiently operated at an intermediate gear before shifting to the lower gear. The ambient condition may be an ambient humidity level or value (e.g., humidity level or value). The humidity value may be a percentage. Due to increased condensate formation, the transient operation at the intermediate gear may be responsive to a higher ambient humidity level. Alternatively, in response to a lower ambient humidity level, the transmission gear may be shifted directly from the higher gear to the lower gear without operating in the intermediate gear. At lower humidity levels, there may be less condensate in the CAC. Thus, downshifting directly from a higher gear to a lower gear may not cause engine misfire. When shifting through an intermediate gear, the intermediate gear may be held for a duration, the duration increasing with increasing ambient humidity level.

As humidity and the amount of condensate in the CAC increase, the chance of engine misfire may increase when performing a multiple gear downshift. As such, in response to a condensate level in a CAC and a request to downshift a transmission gear from a higher gear to a lower gear, the transmission may transiently operate at an intermediate gear before shifting to the lower gear. As discussed above, the condensate level may be above a first threshold level. The first threshold level may be based on an increase in airflow through the CAC at the downshift request.

Figure 2:
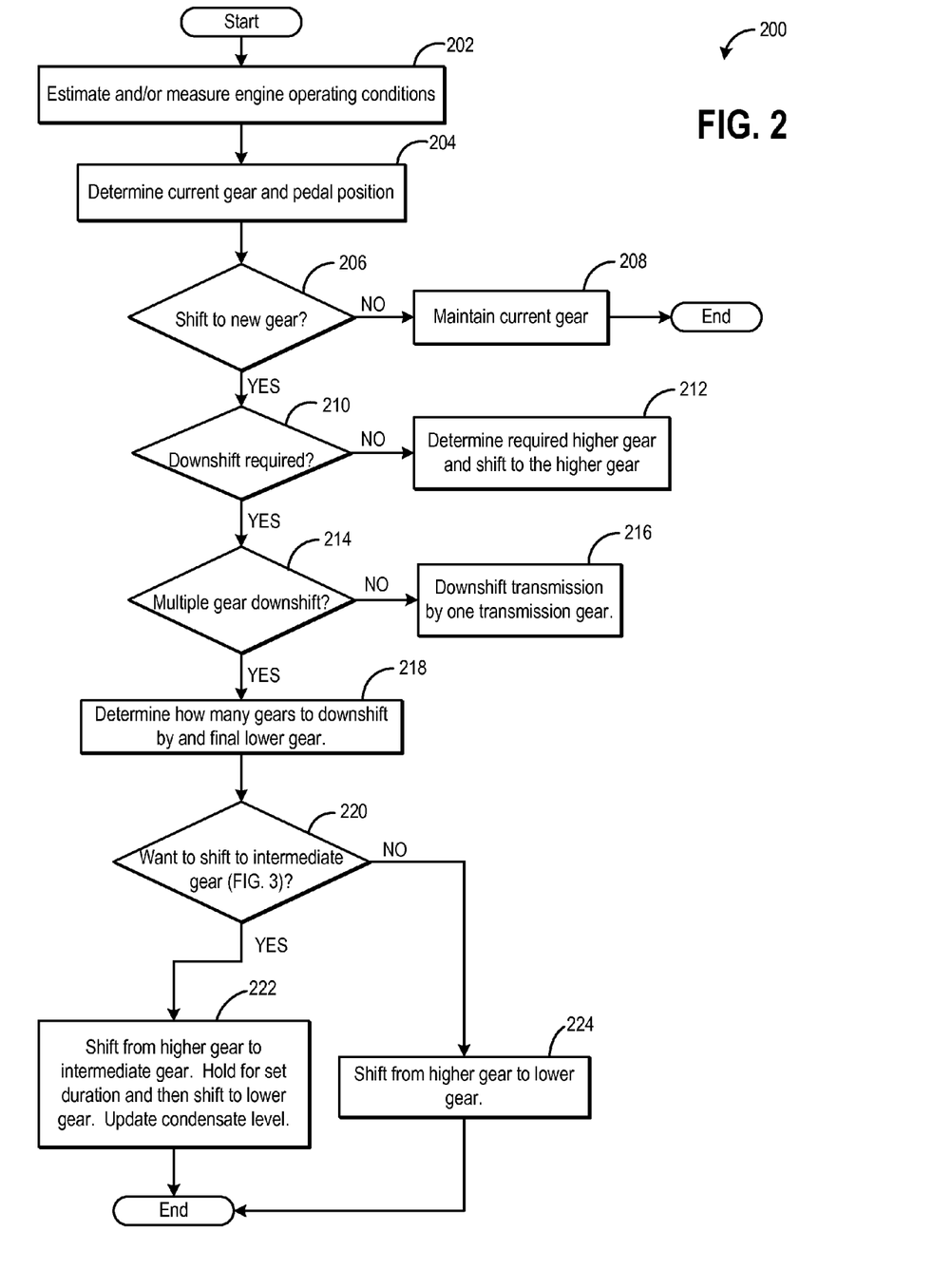
FIG. 2 shows a flow chart illustrating a method for shifting a transmission gear.

Turning now to FIG. 2, an example method 200 for shifting a transmission gear is depicted. In response to a request to shift to a new gear, the transmission may upshift to a higher gear, downshift by a single gear, or downshift by multiple gears. A multiple gear downshift request may either be performed directly (from a higher to a lower gear) or in stages, by briefly downshifting to an intermediate gear.

At 202, method 200 includes estimating and/or measuring engine operating conditions. These may include driver torque demand (based on a pedal position), engine speed (Ne) and load, ECT, boost level, ambient temperature and pressure, MAF, MAP, and current transmission gear. The routine determines the current gear and pedal position at 204. This information may be used at 206 to determine whether shifting to a new gear is required. If shifting is not required, the controller maintains the current gear at 208 and the method ends. However, if shifting to a new gear is required, the method proceeds to 210 where a downshift request is confirmed. If a downshift to a lower gear is not required, the routines determines the required higher gear at 212 and then shifts a transmission gear from the current gear to the higher gear. Alternatively, if a downshift is required at 210, the routine determines at 214 whether the required downshift is a multiple gear downshift (e.g., downshift from a sixth transmission gear to a third transmission gear). If only downshifting by a single gear is required, the routine downshifts the transmission by one transmission gear at 216. However, if a multiple gear downshift is required, the routine determines at 218 how many gears to downshift the transmission gear by and subsequently, the final lower gear.

At 220, the method includes determining whether the multiple gear downshift request may be performed directly or in stages, by briefly downshifting to an intermediate gear. Downshifting by shifting to an intermediate gear may be based on air mass flow, CAC condensate level, and the requested gear downshift. Details on this method are presented at FIG. 3. If shifting to an intermediate gear is not needed, the routine directly downshifts from the higher gear to the lower gear at 224. Alternatively, if shifting to an intermediate gear is requested, the routine shifts from the higher gear to the intermediate gear at 222. The controller may hold the transmission at the intermediate gear for duration and then shift to the lower gear. The condensate level in the CAC may then be updated. Additional details on the procedure at 222 are presented at FIG. 3.

Figure 3:
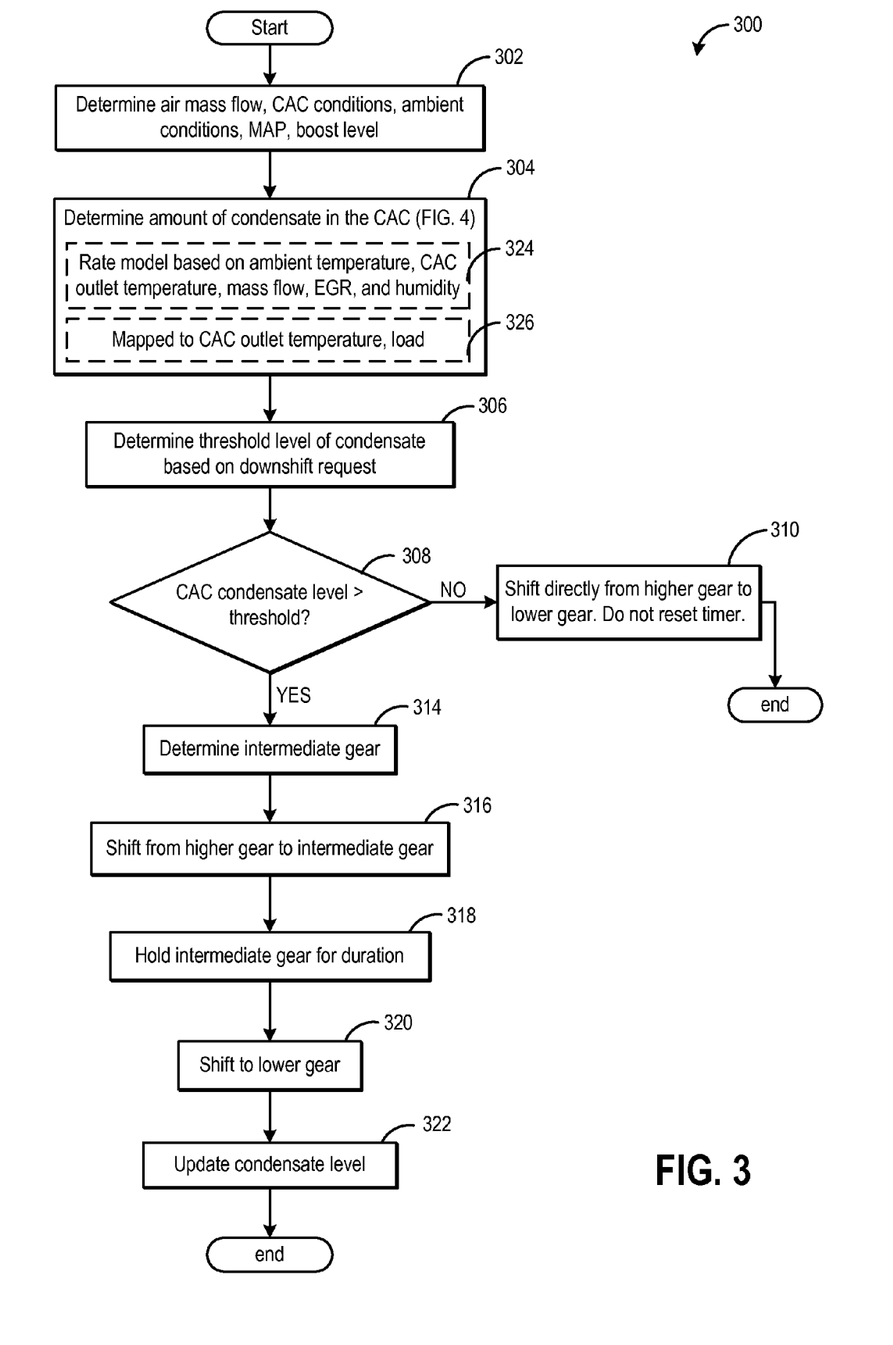
FIG. 3 shows a flow chart illustrating a method for performing a multiple gear downshift by transiently operating in an intermediate gear.
Figure 4:
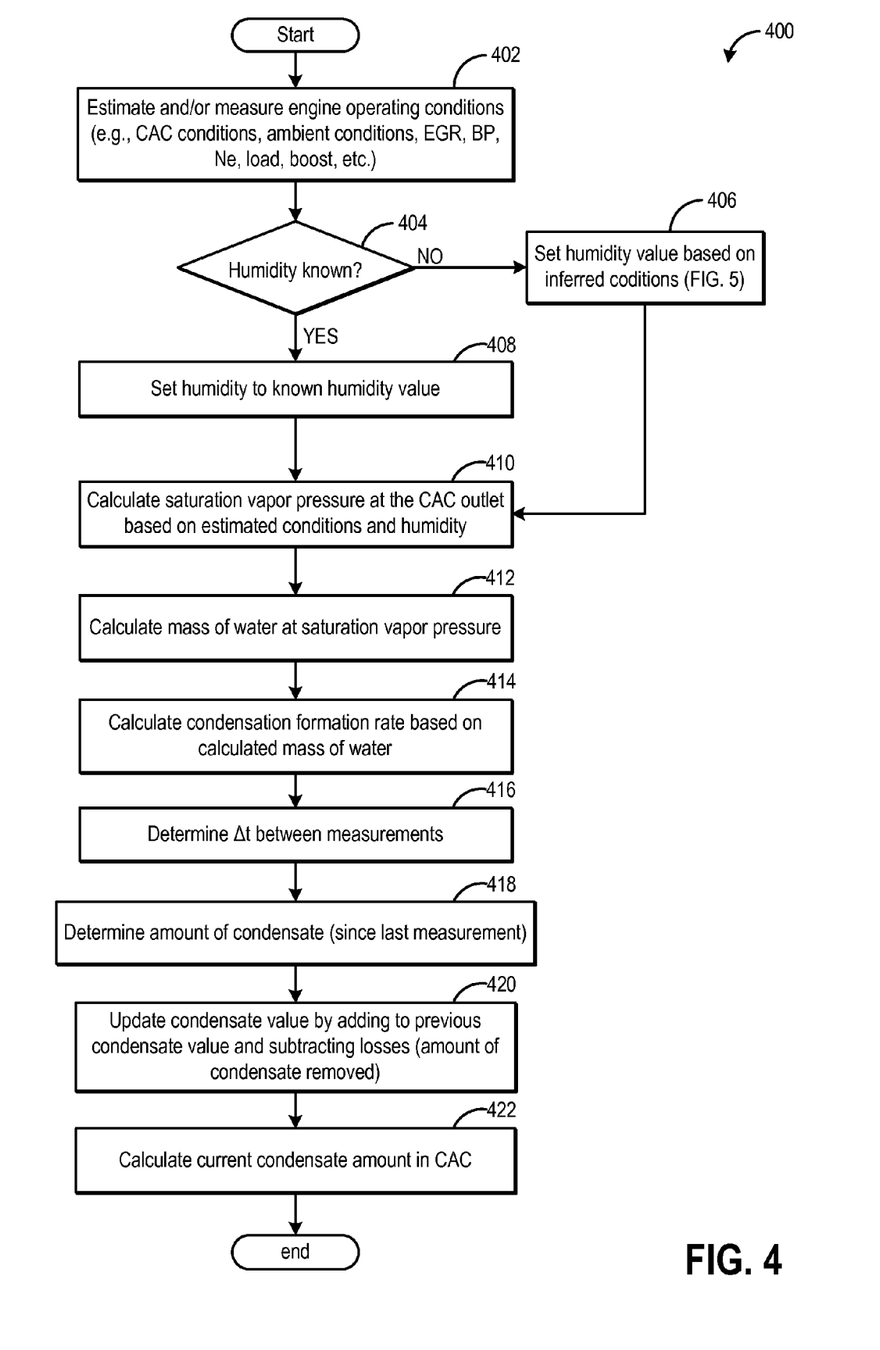
FIG. 4 shows a flow chart illustrating a method for determining a condensate level at the charge air cooler.

FIG. 3 illustrates an example method 300 for performing a downshift of a transmission gear from a higher gear to a lower gear. During select conditions, the transmission may transiently operate in an intermediate gear before shifting to the lower gear. The transient operation in the intermediate gear may include temporarily engaging the intermediate gear, at least partially and optionally fully, during one or more of the torque phase and inertial phase of the shift. The transient operation in the intermediate gear may include engagement of transmission clutches configured to engage the intermediate gear, in one example.

At 302, method 300 includes determining the air mass flow (rate), CAC conditions (inlet and outlet temperature, inlet and outlet pressure, condensate level, etc.), ambient conditions (ambient temperature and humidity), MAP, and boost level. An amount or level of condensate in the CAC may be determined based on this data at 304. In one example, at 324, and as further elaborated at the model at FIG. 4, a rate of condensate formation within the CAC may be based on ambient temperature, CAC outlet temperature, air mass flow, EGR, and humidity. This may then be used to calculate the amount or level of condensate in the CAC. In another example, at 326, a condensation formation value may be mapped to CAC outlet temperature and a ratio of CAC pressure to ambient pressure. In an alternate example, the condensation formation value may be mapped to CAC outlet temperature and engine load. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature.

Returning to FIG. 3, at 306 the method determines the first threshold level of condensate, based on the increase in airflow through the CAC at the downshift request. For example, if the downshift request is from the sixth transmission gear to the fourth transmission gear, air mass flow and airflow through the CAC may increase to a first level. This first level of airflow may result in the first threshold level of condensate to be set at a higher value. In another example, if the downshift request is from the sixth transmission gear to the second transmission gear, air mass flow and airflow through the CAC may increase to a second level, greater than the first. In response, the controller may set the first threshold level of condensate to a lower level. In this way, by setting the first threshold level of condensate based on a predicted increase in airflow, engine misfire may be reduced. In an alternate example, the first threshold level of condensate may be a set level, independent of the downshift request. This set first threshold level may be based on the minimum amount of condensate that may cause misfire during a multiple gear downshift.

The method at 308 includes determining if the CAC condensate level is above the first threshold level. If the amount of condensate in the CAC is not above the first threshold level, the routine continues to 310 were the transmission is shifted from a higher gear to a lower gear, as requested. However, if the CAC condensate level is greater than the first threshold level, the routine continues on to 314. At 314, the controller determines the intermediate gear. In some cases, there may only be one choice of intermediate gear. For example, when shifting from a fourth to a second transmission gear, the third transmission gear may be the only option for the intermediate gear. In other cases, there may be multiple intermediate gear options and the selection of intermediate gear may be based on the level (or amount) of condensate in the CAC. For example, if the difference between the first threshold level of condensate and the condensate level in the CAC is high and the vehicle must shift from the fifth to the second transmission gear, the intermediate gear may be closer the fifth gear (such as four vs. three). In this example, shifting 5-3-2 may cause misfire, whereas shifting 5-4-2 may increase air mass flow to a first, lower rate (at the intermediate gear), reducing the chance of misfire. The gear change may further be based on a target air mass flow rate at the newly selected gear so that condensate may be purged in such a manner as to reduce the chance of misfire.

After determining the intermediate gear at 314, the routine downshifts the transmission gear from the higher gear to the chosen intermediate gear at 316. The routine at 316 may also include adjusting engine torque. Torque adjustments may include, at part throttle increasing throttle opening to maintain requested torque (limited by the maximum airflow that limits the ingestion of condensate level below the misfire rate). In the event a shift to a lower gear may result in more torque than requested, reducing throttle opening or retarding spark advance may be used to match the driver demanded torque level. The intermediate gear is held for duration at 318. In one example, the duration may be a pre-set value used for every downshift (e.g., set duration). In another example, the duration may be based on the amount of condensate in the CAC and the requested gear downshift. Specifically, the duration may be the amount of time for the CAC condensate level to decrease below a second threshold level. In one example, the second threshold level may be very low (e.g., zero), such that all the condensate is purged from the CAC. In another example, the second threshold level may be an amount of condensate that won't cause misfire at increased airflow. Thus, for a larger amount of CAC condensate, the duration at the intermediate gear may be longer. In another example, when the requested gear downshift is smaller (e.g., downshifting by three gears rather than four gears), the duration at the intermediate gear may be shorter. In this way, the duration may increase for increasing amounts of condensate in the CAC. After holding the intermediate gear for a duration, the routine at 320 includes downshifting from the intermediate gear to the requested lower gear. Finally, at 322, the routine may update the condensate level in the CAC. In this way, in response to a multiple gear downshift request, when a condensate level in a CAC is greater than a first threshold level, the transmission may be downshifted from a higher gear to an intermediate gear, and then to a requested lower gear. As such, condensate introduction from the CAC into the engine may be controlled, reducing engine misfire events.

FIG. 4 illustrates a method 400 for estimating the amount of condensate stored within a CAC. Based on the amount of condensate at the CAC relative to a threshold value, different downshifting operations, such as those discussed at FIG. 3, may be initiated.

The method begins at 402 by determining the engine operating conditions. These may include, as elaborated previously at 302, ambient conditions, CAC conditions (inlet and outlet temperatures and pressures, flow rate through the CAC, etc.), mass air flow, MAP, EGR flow, engine speed and load, engine temperature, boost, ambient pressure, etc. Next, at 404, the routine determines if the ambient humidity (humidity) is known. In one example, the ambient humidity may be known based on the output of a humidity sensor coupled to the engine. In another example, humidity may be inferred from a downstream UEGO sensor or obtained from infotronics (e.g., internet connections, a vehicle navigation system, etc.) or a rain/wiper sensor signal. If the humidity is not known (for example, if the engine does not include a humidity sensor), the humidity may be set at 406 based on inferred conditions, as elaborated at FIG. 5. However, if the humidity is known, the known humidity value, as provided by the humidity sensor, may be used as the humidity setting at 408.

The ambient temperature and humidity may be used to determine the dew point of the intake air, which may be further affected by the amount of EGR in the intake air (e.g., EGR may have a different humidity and temperature than the air from the atmosphere) and the pressure ratio of the CAC pressure to the ambient pressure. The difference between the dew point and the CAC outlet temperature indicates whether condensation will form within the cooler, and the mass air flow may affect how much condensation actually accumulates within the cooler. Additionally, the internal design of the CAC may characterized and determine the amount of condensate that stays entrained in the air flow, and the amount that condenses in the CAC. The entrainment and retention values may be determined empirically or modeled from the internal characteristics of the internal design of the CAC.

At 410, an algorithm may calculate the saturation vapor pressure at the CAC outlet as a function of the CAC outlet temperature and pressure. The algorithm then calculates the mass of water at this saturation vapor pressure at 412. Finally, the condensation formation rate at the CAC outlet is determined at 414 by subtracting the mass of water at the saturation vapor pressure condition at the CAC outlet and the retention value as determined by empirical determine lookup function or modeled form the internal design of the CAC from the mass of water in the ambient air. By determining the amount of time between condensate measurements at 416, method 400 may determine the amount of condensate within the CAC since a last measurement at 418. The current condensate amount in the CAC is calculated at 422 by adding the condensate value estimated at 418 to the previous condensate value and then subtracting any condensate losses since the last routine (that is, an amount of condensate removed. for example, via purging routines) at 420. Condensate losses may be assumed to be zero if the CAC outlet temperature was above the dew point. Alternatively, at 420, the amount of condensate removed may be modeled or determined empirically as a function of air mass and integrated down with each software task loop (that is, with each run of routine 400).

Figure 5:
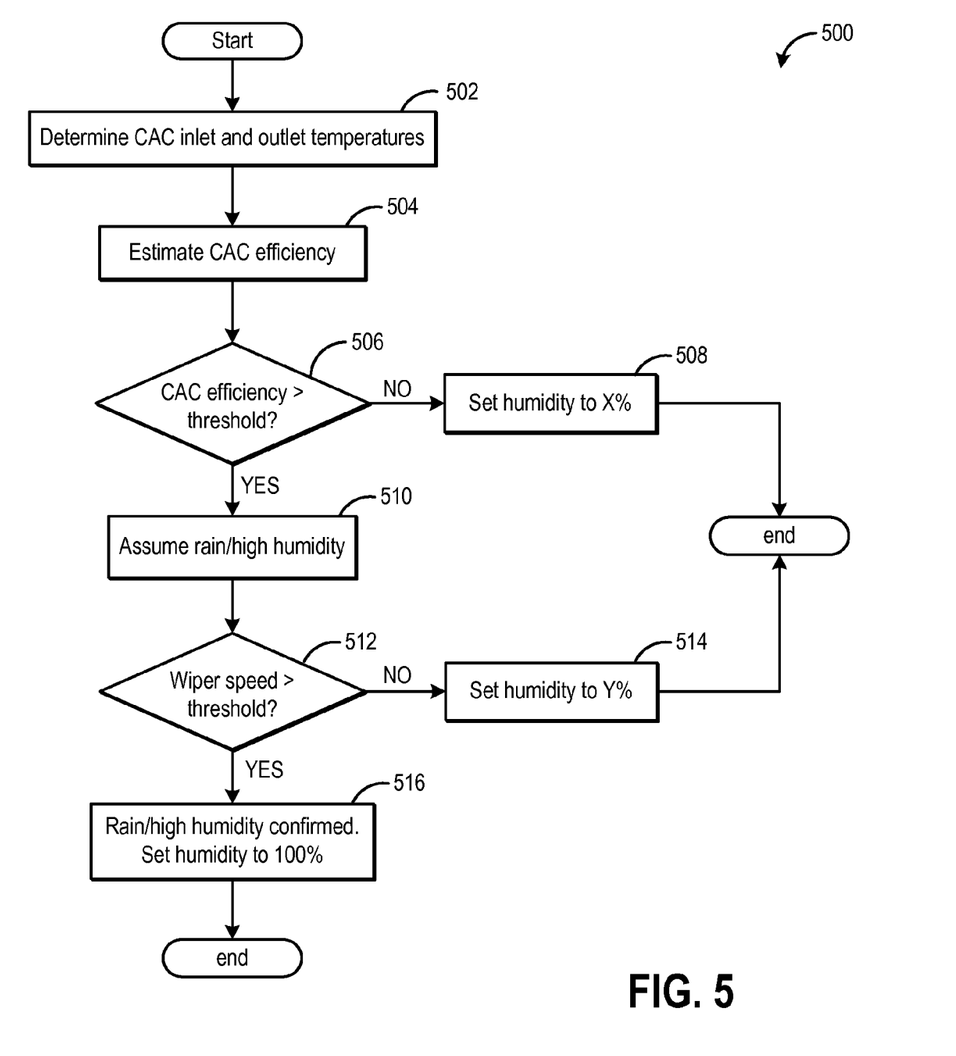
FIG. 5 presents a method for estimating a humidity value used in the condensate model.

FIG. 5 presents a method for estimating a humidity value used in the condensate model presented at FIG. 4. High humidity (e.g., from the presence of rain) may be inferred from engine operating conditions, such as windshield wiper (wiper) operation and/or high CAC efficiency. By evaluating CAC efficiency and/or wiper speed, a more accurate humidity value may be set and used to calculate the condensate level in the CAC. This may then be used to control the downshifting operations described above.

Method 500 begins at 502 where the controller determines the inlet and outlet temperatures of the CAC. These temperatures may be used at 504 to estimate CAC efficiency. For example, a low CAC outlet temperature may indicate increased cooling of the CAC and a high CAC efficiency value. In another example, higher CAC outlet temperature may result in a lower CAC efficiency value. If CAC efficiency is high, condensate formation in the CAC may be higher. During rainy or high humidity ambient conditions, CAC efficiency may increase, increasing condensate formation. Thus, high CAC efficiency values may indicate high humidity conditions. At 506, the routine determine if the CAC efficiency is greater than a threshold. If CAC efficiency is not great than this threshold, humidity is set to a lower value, X %, (e.g., something less than 40% or a value that results in no condensation at the measured CAC outlet temperature) at 508. In one embodiment, this lower value may be 0%. In another embodiment, this value may be something smaller than 100%.

Returning to 506, if CAC efficiency is greater than the threshold, the routine may assume rain and/or high humidity. In some embodiments, the method may end here and set the humidity value to 100% for method 400. In other embodiments, as shown in method 500, the routine may continue on to 512 to determine if wiper speed is greater than a threshold speed. If the wiper speed is not greater than the threshold speed and the wipers have not been activated for a minimum threshold wiper on time, the humidity value may be set to a percentage, Y %, at 514. This percentage may be around 80-90%, or some other vale that represents little accumulation of condensate at the given CAC outlet pressure. In one example, this percentage may be something greater than 0% but less than 100%. In some examples, humidity value Y % may be greater than humidity X %. In other examples, humidity values X % and Y % may be the same. If wiper speed is greater than the threshold speed at 512, rain/high humidity is confirmed and may be set to 100% at 516. This value is then used at 406 in method 400. In some embodiments, method 500 may only include inferring high humidity from wiper speed. In other embodiments, a wiper on signal, instead of wiper speed, may indicate high humidity and set the humidity value to 100%.

Now turning to FIG. 6, graph 600 shows example transmission gear shifting operations during different driving conditions. Specifically, graph 600 shows a change in pedal position (PP) indicative of an operator torque demand at plot 604, a corresponding change in vehicle speed is shown at plot 606, and a change in engine speed (Ne or RPM) is shown at plot 608. A change in transmission gear is shown at plot 602 where 6 is the highest available gear and 1 is the lowest available gear. Further, graph 600 shows air mass flow (rate) at plot 610, airflow through the CAC at plot 612, and CAC condensate level at plot 614.

Prior to t1, pedal position may be at a low position (plot 604), requesting a small amount of torque and vehicle speed (plot 606). As a result, the vehicle may begin in a transmission gear 1 (plot 602). At time t1, a vehicle operator may slowly apply pressure to the accelerator pedal, resulting in a gradual increase in pedal position (plot 604), vehicle speed (plot 606), and engine speed (plot 608). The increase in pedal position and vehicle speed may generate a request to upshift the transmission gear. As pedal position continues to increase from time t1 to time t2, the transmission gear is shifted into higher gears (plot 602). At time t2, pedal position becomes constant and the transmission gear is maintained at transmission gear 6.

At time t3, pedal position increases (plot 604) and, as a result, a downshift request is generated. A multiple gear downshift may be requested, based on the pedal position increase. The transmission may be requested to downshift by two transmission gears, from transmission gear 6 to transmission gear 4. At time t3, the condensate level (plot 614) is below first threshold level 616. In response to condensate level below first threshold level 616, the transmission gear is shifted from a transmission gear 6 to transmission gear 4, without operating in an intermediate gear. Shifting without operating in the intermediate gear may include not shifting into, or out of, or operating at, any of the plurality of intermediate gears between the starting gear and ending gear of the transmission. Further, shifting without operating in the intermediate gear may include not operating in each and every gear intermediate the starting gear and ending gear of the transmission during the shift.

Downshifting during the increase in pedal position at time t3 results in an increase in vehicle speed (plot 606) and engine speed (plot 608). Additionally, in response to downshifting from higher transmission gear 6 to lower transmission gear 4, air mass flow (plot 610) and airflow through the CAC (plot 612) increase between time t3 and time t4, reducing the condensate level in the CAC (CAC cleansing or purging). Since CAC condensate level was below the first threshold level 616 at time t3, engine misfire may not occur during the condensate purging.

Between time t3 and t4 a tip-out may occur, causing the transmission to downshift a transmission gear and air mass flow and airflow through the CAC to decrease. During this time, vehicle speed may continue to decrease. As pedal position again increases (plot 604), the transmission gear may be upshifted to higher gears, causing engine speed to decrease and air mass flow to decrease at time t4. Between time t4 and time t5, air mass flow (plot 610) and airflow through the CAC (plot 612) remain low, while condensate level (plot 614) continues to increase.

At time t5, pedal position increases rapidly, possibly indicating a WOP condition. This may generate a downshift request from the current transmission gear 5 to transmission gear 2. This larger transmission downshift request may result in a larger increase in air mass flow and airflow through the CAC. In response to the larger multiple gear downshift request, the controller may decrease the first threshold level 616. At time t5, CAC condensate level is above first threshold level 616. Thus, in response, transmission gear 5 is first downshifted to intermediate transmission gear 4. Air mass flow (plot 612) and airflow through the CAC (plot 612) increase during the downshift. As a result, condensate is blown off the CAC and into the engine, causing condensate level (plot 614) to decrease. The intermediate transmission gear 4 is held for duration d1, until CAC condensate level decreases below the second threshold level 618 at time t6. At time t6, the transmission gear is downshifted from intermediate transmission gear 4 to lower transmission gear 2. Engine speed and vehicle speed increase with each downshift. Air mass flow and airflow through the CAC increase to a higher level, blowing off any remaining condensate from the CAC. Since condensate level dropped below the second threshold level 618 before the additional increase in air mass flow, engine misfire does not occur.

In this way, transiently operating in an intermediate transmission gear allowed condensate to be blown off at a lower air mass flow, reducing the chance of misfire. If an intermediate gear were not used for the downshift at time t5, misfire may have occurred when downshifting directly from transmission gear 5 to transmission gear 2.

Returning to graph 600, another sudden increase in pedal position occurs at time t7, after an amount of time has elapsed. Before time t7, pedal position (plot 604), vehicle speed (plot 606), and engine speed (plot 608) are at relatively constant levels. Air mass flow (plot 610) and airflow through the CAC (plot 612) remain at low levels and CAC condensate level (plot 614) steadily increases. At time t7, pedal position increases suddenly and a downshift request is generated. The downshift request at t7 may be from transmission gear 4 to transmission gear 2. This is a smaller downshift request than at time t5. Thus, the smaller downshift request may increase airflow to a lower level. In response to the smaller multiple gear downshift request, the controller may increase the first threshold level 616. At time t7, CAC condensate level is greater than first threshold level 616. In response, the controller may downshift the transmission gear from transmission gear 4 to intermediate transmission gear 3. In response to the downshift at time t7, engine speed and vehicle speed increase. This first downshift increases air mass flow (plot 610) and airflow through the CAC (plot 612), causing condensate to be purged from the CAC and a decrease in CAC condensate level (plot 614). The intermediate gear is held for duration d2, until the condensate level decreases below second threshold level 618 at time t8. Since a larger amount of condensate was in the CAC at time 7 than at time t5, duration d2 may be longer than duration d1. At time t8, the transmission downshifts from intermediate transmission gear 3 to lower transmission gear 2. Airflow through the CAC increases to a higher level (plot 612). However, since CAC condensate level is below second threshold level 618, engine misfire does not occur.

Thus, downshifting a transmission gear may be controlled based on condensate level in a CAC. During a first condition, as shown at times t5 and t7 in graph 600, when condensate level in a CAC is greater than a first threshold level, a transmission gear may be shifted from the higher gear to the requested lower gear by transiently operating in an intermediate gear before shifting to the requested lower gear. Alternatively, during a second condition, as shown at time t3 in graph 600, when condensate level in a CAC is less than a first threshold level, a transmission gear may be shifted from a higher gear to a lower gear when requested, without operating in an intermediate gear.

Additional transmission gear shifting operations are shown at FIG. 7. Herein, graph 700 illustrates three different downshifting operations and the resulting increase in air mass flow and amount of condensate purged from the CAC. As air mass flow increases, airflow through the CAC also increases. Specifically, a change in transmission gear is shown at plot 702, air mass flow is shown at plot 704, and the amount of condensate purged from the CAC (e.g., condensate leaving the CAC) is shown at plot 706. Three different downshifting examples are shown (A, B, and C). Prior to time t1, the vehicle may be in transmission gear 5 with a relatively constant air mass flow in all three examples. In a first example, A, a transmission gear may be downshifted directly from transmission gear 5 to transmission gear 1 (plot 702*a*) at time t1. In response, air mass flow may increase above a threshold level 708 (plot 704*a*). This threshold level may be the air mass flow level which causes engine misfire if condensate level is above the first threshold level. As air mass flow increases (plot 704*a*), the amount of condensate purged from the CAC increases (plot 706*a*). Since air mass flow increases quickly to a high level, condensate may be blown off at an increased rate. As a result, a larger amount of condensate may be purged from the CAC between time t1 and time t2. Since air mass flow increases above threshold level 708 and blows off a large amount of condensate at once, engine misfire may occur in this example.

In a second example, B, the transmission gear may be downshifted from transmission gear 5 to an intermediate transmission gear 3 (plot 702*b*) at time t1. In response, air mass flow may increase to a level below threshold level 708 (plot 704*b*). The increase in air mass flow causes condensate to be purged from the CAC (plot 706*b*). However, since air mass flow is lower than in first example A, condensate may be purged at a slower rate. As a result, less condensate may be purged from the CAC between time t1 and time t2. The intermediate gear may be held for a duration, from time t1 to time t2. Then, at time t2, the transmission gear may be downshifted from the intermediate transmission gear 3 to lower transmission gear 1. Air mass flow may increase above threshold level 708 (plot 704*b*), purging the remaining condensate from the CAC. Only a small amount of condensate is purged from the CAC after time t2. Thus, since most of the condensate was purged with a smaller air mass flow at the intermediate gear, engine misfire may not occur. In an alternate example, the intermediate gear may be held for a slightly longer duration to allow all the condensate to purge form the CAC before downshifting to the lower gear. This may further decrease the chance of engine misfire.

While transmission gear 3 was chosen as the intermediate gear in second example B, other intermediate gears could have been used. For example, in a third example, C, the transmission gear may be downshifted from transmission gear 5 to an intermediate transmission gear 4 (plot 702*c*). In this example, the intermediate gear is closer to the higher gear (transmission gear 5). In response, air mass flow increases to a level below threshold level 708 (plot 704*c*), but below the air mass flow level in second example B (plot 704*b*). Condensate is purged from the CAC at a slower rate than in the first two examples, due to the lower air mass flow level. Thus, between time t1 and time t2, less condensate is purged from the CAC (plot 706*c*). At time t2, the transmission gear is downshifted from the intermediate transmission gear 4 to lower transmission gear 1. Air mass flow may increase above threshold level 708 (plot 704*c*), purging the remaining condensate from the CAC. A larger amount of condensate is purged form the CAC after time t2 than in the first two examples. However, since a portion of the total condensate in the CAC was purged while in the intermediate gear, engine misfire may not occur. In alternate examples, the intermediate gear may be held for a longer duration to further decrease the amount of condensate in the CAC and reduce the chance of engine misfire.

In this way, downshifting a transmission gear may be controlled in response to pedal position and CAC condensate level to reduce engine misfire events. In response to a multiple gear downshift request, the downshift may performed directly (from a higher to a lower gear) or in stages, by briefly downshifting to an intermediate gear. If CAC condensate level is greater than a first threshold level, the downshift may be performed in stages, using an intermediate gear. However, if the CAC condensate level is less than a first threshold level, the controller may perform the downshift directly, shifting from the higher transmission gear to the lower transmission gear, without utilizing an intermediate gear. Thus, based on condensate level in the CAC and the specific downshift request, downshifting may be controlled to improve engine performance. By first downshifting to an intermediate gear during select conditions, the increase in air mass flow may be controlled to a level that safely purges condensate from the CAC without causing misfire.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method for an engine, comprising:
    in response to a condensate level in a charge air cooler and a request to downshift a transmission gear from a higher gear to a lower gear, transiently operating at an intermediate gear before shifting to the lower gear.

2. The method of claim 1, wherein transiently operating at the intermediate gear is responsive to the condensate level being above a first threshold level.

3. The method of claim 2, wherein the first threshold level is based on an increase in airflow through the charge air cooler at a downshift request.

4. The method of claim 1, wherein the intermediate gear is held for a duration, the duration based on a current level of condensate in the charge air cooler at a transmission shift.

5. The method of claim 1, wherein the condensate level is based on ambient humidity, the ambient humidity increasing with increasing charge air cooler efficiency and windshield wiper speed.

6. The method of claim 1, wherein the intermediate gear is chosen based on the condensate level in the charge air cooler.

7. The method of claim 1, wherein the request to downshift the transmission gear is a multiple gear downshift request.

8. The method of claim 7, wherein the multiple gear downshift request is responsive to a large increase in pedal position, including wide open pedal.

* * * * *